United States Patent [19]

Wirsbinski

[11] 3,945,332

[45] Mar. 23, 1976

[54] APPARATUS FOR INJECTING MATERIAL INTO THE SOIL

[75] Inventor: James L. Wirsbinski, Long Lake, Minn.

[73] Assignee: Veda, Inc., Long Lake, Minn.

[22] Filed: Jan. 2, 1975

[21] Appl. No.: 538,175

[52] U.S. Cl. .................................................. 111/7
[51] Int. Cl.² ........................................ A01C 23/02
[58] Field of Search ................................. 111/7, 6

[56] References Cited
UNITED STATES PATENTS

| 2,285,932 | 6/1942 | Leavitt | 111/7 |
| 2,782,739 | 2/1957 | Freer | 111/7 |
| 3,413,940 | 12/1968 | Vissers | 111/7 |
| 3,608,645 | 9/1971 | Meiners | 111/7 X |
| 3,793,967 | 2/1974 | van den Berg | 111/7 |
| 3,865,057 | 2/1975 | Frazier | 111/7 |

Primary Examiner—Stephen O. Pellegrino
Attorney, Agent, or Firm—Burd, Braddock & Bartz

[57] ABSTRACT

An implement for dispensing liquid and liquid-like materials, as liquid manure and the like, into and below the surface of the soil. The implement has a transverse hollow bar supporting a plurality of earthworking tools. Lift arms controlled with hydraulic cylinders connect the tool bar to a vehicle carrying the material. The vehicle delivers the material through a hose to the hollow tool bar. Separate hoses connected to the tool bar and to nozzles attached to the earthworking tools carry the material from the tool bar to the nozzles for discharge below the surface of the soil behind the earthworking tools.

17 Claims, 9 Drawing Figures

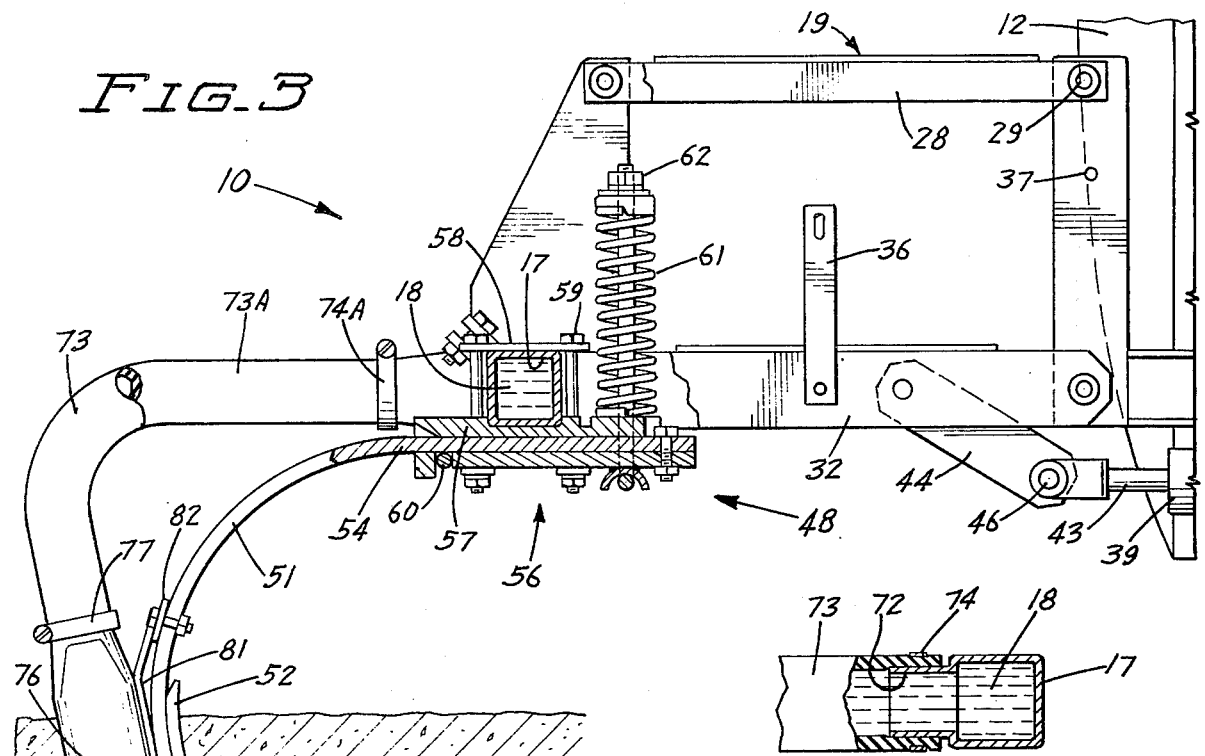
Fig. 3
Fig. 5
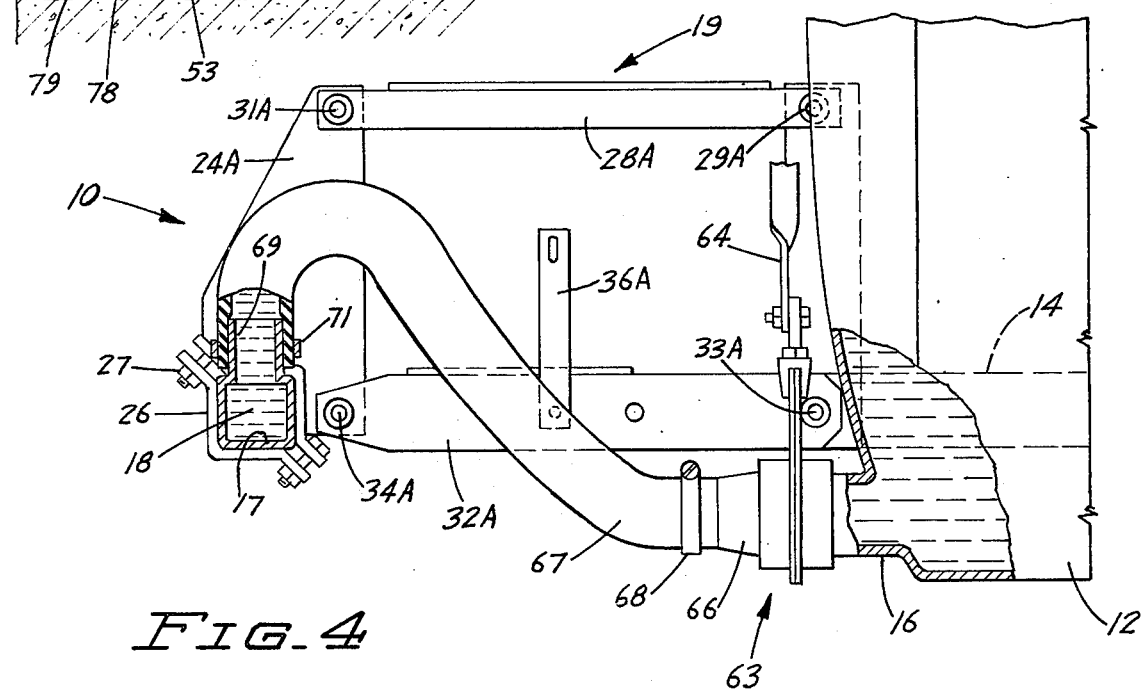
Fig. 4

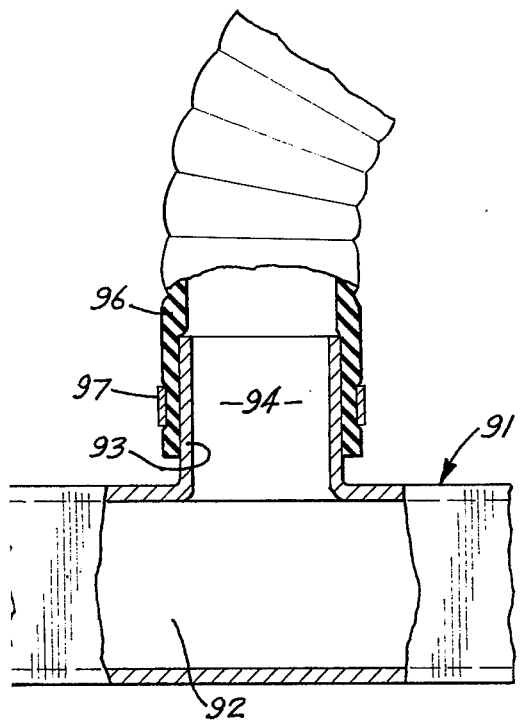
FIG. 7
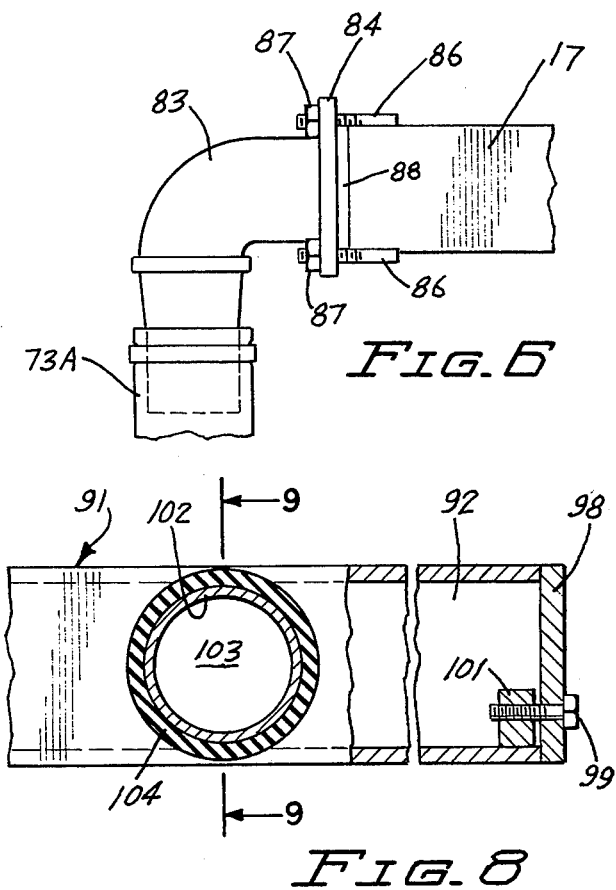
FIG. 6
FIG. 8
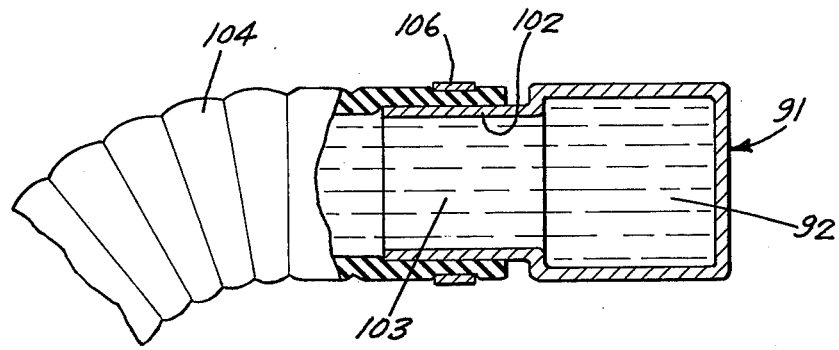
FIG. 9

3,945,332

APPARATUS FOR INJECTING MATERIAL INTO THE SOIL

BACKGROUND OF INVENTION

Maximum effectiveness of agricultural chemicals, herbicides and liquid manure is attained when these materials are dispensed into the ground. Liquid manure injectors are used to dispense liquid manure into the ground behind earthworking tools. The implements are mounted on vehicles which include a tank for carrying the liquid manure. An example of a manure spreader having a device for supplying liquid manure to an area under the ground surface is disclosed in U.S. Pat. No. 3,793,967. Several commercial liquid manure injectors utilize a tool bar for carrying furrow-opening tools. A plurality of elongated hoses are used to carry the liquid material from a tank directly to dispensing structure connected to the tools. The tool bars are not utilized to carry the liquid material from the tank to the dispensing structure.

Implements in the nature of vehicles carrying tanks and a plurality of earthworking tools are used to inject liquid and gaseous fertilizers, as anhydrous ammonia, into the soil. Examples of these implements are shown in U.S. Pat. Nos. 2,857,863; 2,973,728; 3,148,642; 3,435,785 and 3,610,184. The implements shown in these patents utilize tool bars for carrying earthworking tools. The tool bars are not tubular members which are utilized to carry the material to be injected into the soil.

SUMMARY OF INVENTION

The invention is directed to an apparatus for dispensing material below the surface of the soil. More particularly, the apparatus is usable to inject fluid, as liquids and gases, into the soil. The apparatus is adapted to be connected to a vehicle or similar means for carrying the fluid material. The apparatus has a tool bar having a passage for carrying material. Means connect the tool bar to the vehicle so that the tool bar moves with the vehicle. A plurality of earthworking tools are mounted on the tool bar for making furrows in the soil. A first means connected to the tool bar carries the material from the storage container on the vehicle to the tool bar passage. A second means connected to the tool bar and the earthworking tools carries the material from the tool bar passage to a location below the surface of the soil behind the earthworking tools.

An object of the invention is to provide an apparatus for dispensing material, as liquid manure, into the soil in a manner which minimizes runoff, odors, fly and insect problems, as well as the unsightly appearance of surface spreading of manure. Another object of the invention is to provide an apparatus for dispensing material into the soil with a tool bar having a passage for carrying the material as it moves from a material storage means to a nozzle for discharging the material into the soil. A further object of the invention is to provide a tool bar which carries material and thereby adds weight to the tool bar to improve the soil penetration of the tools mounted on the tool bar. An additional object of the invention is to provide a tool bar with a plurality of earthworking tools that are adjustable relative to the tool bar and usable in sod, row crops and stubble fields. A still further object of the invention is to provide a tool bar with a passage for carrying material to be injected into the soil which has material flow characteristics and turbulence which keeps the material in the tube agitated to prevent plugging of the passage. Yet another object of the invention is to provide an apparatus for injecting material into the soil in a manner to obtain maximum fertility value from the liquid manure.

IN THE DRAWINGS

FIG. 3 is an enlarged sectional view taken along the line 3—3 of FIG. 1;

FIG. 4 is an enlarged sectional view taken along the line 4—4 of FIG. 1;

FIG. 5 is an enlarged sectional view taken along the line 5—5 of FIG. 1;

FIG. 6 is an enlarged plan view of one end of the tool bar in the apparatus of FIG. 1;

FIG. 7 is a fragmentary elevational view, partly sectioned, of a modified tool bar usable with the apparatus of FIG. 1;

FIG. 8 is a rear elevational view, partly sectioned, of the right end of the tool bar of FIG. 7; and FIG. 9 is a sectional view taken along the line 9—9 of FIG. 8.

DESCRIPTION OF PREFERRED EMBODIMENTS

Figure 1:
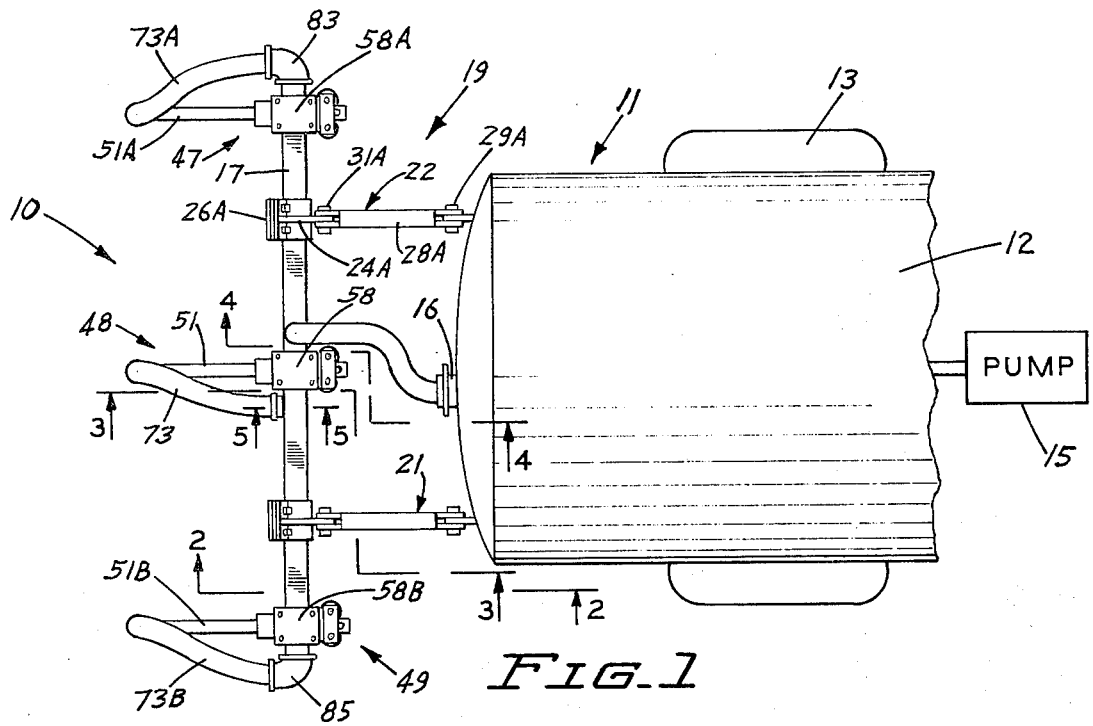
FIG. 1 is a fragmentary top plan view of a liquid material carrying vehicle equipped with the apparatus for injecting liquid material below the surface of the soil.

Referring to the drawing, there is shown in FIG. 1 the apparatus of the invention indicated generally at 10 for dispensing material below the surface of the soil. Apparatus 10 is mounted on a vehicle 11. Vehicle 11 has a material storing tank 12 supported on the ground by a pair of wheels 13. The wheels 13 are connected to a frame 14 supporting tank 12. The tank 12 has a material outlet 16 for allowing the material to move from the tank 12 to the apparatus 10 for dispensing material below the surface of the soil.

The vehicle 11 can be a liquid manure spreading apparatus as disclosed in U.S. application Ser. No. 500,133 filed Aug. 23, 1974. The disclosure of this invention is hereby incorporated by reference. The liquid manure spreading apparatus has a tank having an inside chamber for storing liquid manure. The tank is supported on a wheel structure and is connectable to a tractor or towing unit for moving the vehicle along the ground. A pump is operable to selectively evacuate air from the tank and supply air under pressure to the tank. A manure discharge assembly mounted on the tank is operable when the air under pressure is supplied to tank to spread manure onto the ground. A valve structure operably connected between the pump and the tank is operable to selectively permit the removal of air from the tank or the supply of air under pressure to the tank.

The vehicle 11 can be an apparatus for spreading material as disclosed in U.S. application Ser. No. 435,843 filed Jan. 23, 1974. The disclosure of this application is hereby incorporated by reference. The apparatus has a tank having a chamber for carrying material such as liquid manure. A slinger structure carrying a spreader assembly and a pump is operable to remove material from the tank and discharge the material onto the ground. The pump is operated by the towing vehicle.

Other types of vehicles used to carry bulk material to be dispensed into the ground can be used with the apparatus 10 of the invention. For example, machines having a tank for carrying anhydrous ammonia and chemical fertilizers, herbicides and insecticides can be used with the apparatus 10. The above examples are given by way of illustration and do not limit the utility of the apparatus 10 nor the use of particular fluids or fluid-like materials.

Figure 2:
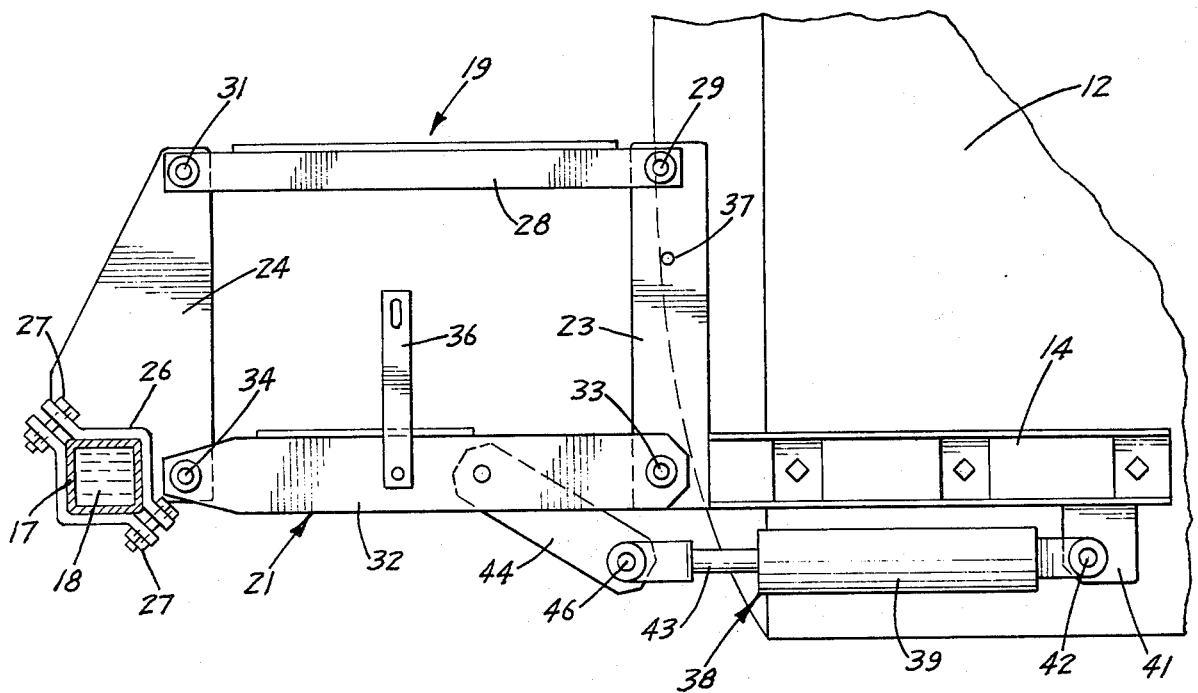
FIG. 2 is an enlarged sectional view taken along the line 2—2 of FIG. 1.

Apparatus 10 has an elongated transverse tool bar 17 located behind vehicle 11. As shown in FIG. 2, tool bar 17 is an elongated linear tube having a square cross sectional configuration and has an elongated longitudinal unobstructed passage 18. The passage 18 extends the full length of tool bar 17. The tool bar 17 can have other cross sectional shapes, as rectangular, round or circular, oval and hexagonal.

A hitch assembly indicated generally at 19 mounts the tool bar 17 to the rear of vehicle 11. Hitch assembly 19 has a pair of movable linkages indicated generally at 21 and 22. Referring to FIG. 2, linkage 21 includes an upright bar 23 secured at its lower end to the rear end of vehicle frame 14. Located rearwardly of bar 23 is an upright plate 24. A clamp 26 having nut and bolt assemblies 27 mounts plate 24 on tool bar 17. The upper ends of bar 23 and plate 24 are connected with a link 28. A pivot pin 29 pivotally connects the forward end of link 28 to the top of bar 23. In a similar manner, a pivot pin 31 connects the rear end of link 28 to the top of plate 24. Located below the top link 28 is a bottom link 32. A pivot pin 33 connects the forward end of link 32 to the bottom of bar 23. The rear end of link 32 is connected to the lower end of plate 24 with a pivot pin 34. The links 28 and 32 form parallel linkages which permit the plate 24 to carry and hold the tool bar 17 at a selected elevation.

The second linkage 22 is identical in structure to the first linkage 21. The corresponding parts shown in FIG. 1 are identified with the same numbers having the suffix A.

Returning to FIG. 2, an upwardly directed lock bar 36 is pivoted to the midsection of the lower link 32. Lock bar 36 is adapted to be connected to the upright bar 23 with a fastener, such as a pin, extended through hole 37. When the lock bar 36 is connected to bar 23, the tool bar 17 is in its raised or transport position.

A hydraulic ram or cylinder indicated generally at 38 is used to control the elevation of tool bar 17. As shown in FIG. 2, hydraulic cylinder 38 has a cylinder 39 connected to a downwardly directed ear 41 with a pivot pin 42. The ear 41 is secured to a bottom portion of vehicle frame 14. Slidably positioned in cylinder 39 is a piston rod 43. The outer end of piston rod 43 is pivotally connected to an arm 44 with a pivot pin 46. Arm 44 is secured by means of welds or the like to the bottom link 32. The arm 44 extends downwardly and forwardly so that the hydraulic cylinder 38, when expanded, does not move up into the frame 14. The second linkage 22 is connected to a similar hydraulic cylinder in the manner shown in FIG. 2.

Referring to FIG. 1, three earthworking tools indicated generally at 47, 48 and 49 are mounted to portions of the tool bar 17. The transverse locations of the tools 47, 48 and 49 on the tool bar 17 can be adjusted to provide suitable spacings between tools to accommodate sod, row crops and stubble fields. The number of earthworking tools used with the tool bar can vary from one to a plurality of tools. The earthworking tools are operative to make longitudinal furrows in the soil on forward movement of the vehicle 11. The material is dispensed into the furrows immediately behind the tools so that the material is incorporated into the soil below the surface of the soil. Earthworking tools 47, 48 and 49 are identical in structure. Earthworking tool 48 is shown in detail in FIG. 3. Corresponding parts of earthworking tool 47 are identified with the same reference numerals having the suffix A and the corresponding parts of earthworking tool 49 are identified with the same reference numerals having the suffix B.

Referring to FIG. 3, earthworking tool 48 has a downwardly arcuate shank 51. A chisel shovel 52 is secured to the lower end of shank 51 with a plurality of bolts 53. The upper end of shank 51 has a generally horizontal forward end 54 attached to a connector assembly 56. The connector assembly 56 is mounted on the tool bar 17. Connector assembly 56 has a first clamp plate 57 located in engagement with the bottom of tool bar 17 and a second clamp plate 58 positioned over the top of tool bar 17. A plurality of nut and bolt assemblies 59 clamp plates 57 and 58 to tool bar 17. The forward end 54 of shank 51 is located below plate 57 and rests on a fulcrum 60. A biasing means comprising a pair of springs 61 acts on U-bolt 62 to bias the forward end 54 into engagement with the bottom of plate 57. In the event that shovel 52 strikes an obstruction, the forward end 54 will pivot about fulcrum 60 against the biasing force of spring 61 and thereby allow shovel 52 to move out of the ground over the obstruction. As soon as the shovel is free of the obstruction, the spring 61 will bias the shovel 52 back to its normal earthworking position, as shown in FIG. 3.

Referring to FIG. 4, the outlet 16 of the tank 12 is connected to a valve 63. Valve 63 has an actuator 64 which is operable to open and close the valve. The actuator 64 is manually operated through rods and levers (not shown) from the towing vehicle. A rearwardly directed nipple 66 is attached to the outlet end of valve 63. A material carrying hose 67 fits over a portion of the nipple 66 and is attached thereto with a clamp 68. Hose 67 extends rearwardly and fits over a nipple or short tube 69 secured to the top of tool bar 17. The passage of nipple 69 is open to the passage 18. A clamp 71 secures the hose 67 to nipple 69. The valve 63 can be mounted on the tube 69 or directly on the tool bar 17. Hose 67 connects the valve to the tank outlet 16.

As shown in FIG. 5, a short tube or nipple 72 extends rearwardly from tool bar 17 and has a passage open to the tool bar passage 18. Hose 73 fits over nipple 72 and is clamped thereon with clamp 74. The discharge end of hose 73 is connected to a downwardly directed nozzle 76. The hose 73 fits over the upper end of nozzle 76 and is clamped thereto with a clamp 77. The nozzle 76 is an elongated, generally flat tubular member having an open bottom discharge end 78. The material flows through nozzle 76 and is discharged below the surface of the soil, as shown at 79, behind shovel 52. The nozzle 76 is secured to the back of shank 51 with a bracket 81. The lower end of bracket 81 is attached to shank 51 with nut and bolt assemblies 53. The upper end of the bracket is connected to a clamp 82 attached to the shank 51. Hoses 73A and 73B can be mounted on short tubes or nipples attached to opposite ends of the tool bar 17 as shown in FIG. 9.

The ends of the tool bar 17 are closed with end caps 83 and 85. The hoses 73A and 73B are connected to end caps 83 and 85, respectively, to deliver the material to the furrows behind the earthworking tools 47 and 49. As shown in FIG. 6, end cap 83 has a right angle coupling connected to a plate 84. The plate 84 has a plurality of holes to accommodate threaded studs 86 secured to the corners of tool bar 17. Nuts 87 threaded on studs 86 clamp gasket 88 into engagement with plate 84 and the end of the tool bar 17. Gasket 88 and plate 84 have aligned openings whereby the liquid material in the passage 18 will flow through the cap 83 into hose 73A.

Referring to FIGS. 7–9, there is shown a modification of the tool bar indicated generally at 91 which operates to carry the earthworking tools and provide a means for distributing the material to be injected below the surface of the soil to separate hoses leading to the earthworking tools. Tool bar 91 is an elongated, square member having a continuous passage 92. As shown in FIG. 7, an upright short tube or nipple 93 is secured to the top of tool bar 91. Nipple 93 has a passage 94 open to the passage of a hose 96. A clamp 97 serves to hold the hose 96 on the nipple 93. The hose 96 is connected to the tank of the vehicle in a manner similar to hose 67 so that the material in the tank is delivered through hose 96 to passage 92 of the tool bar 90.

Referring to FIG. 8, the end of tool bar 91 is closed with an end plate or cap 98. A bolt 99 extended through cap 98 and threaded into a support or nut 101 secured to tool bar 91 is used to hold end plate 98 in engagement with the end of tool bar 91. The plate 98 can be readily removed by removing bolt 99, thereby permitting passage 92 to be cleaned or flushed. End plate 98 can be attached to the end of tool bar 91 with threaded studs similar to studs 86 shown in FIG. 6. The opposite end of tool bar 91 is closed with an end plate similar to end plate 98.

Tool bar 91 has a plurality, preferably three, rearwardly extended outlet tubes or nipples 102. As shown in FIGS. 8 and 9, each nipple 102 has a passage 103 open to the passage 92. A hose 104 is mounted on nipple 102 and secured thereto with a clamp 106. The material in passage 92 flows through nipple 102 into hose 104. Hose 104 leads to the earthworking tool and a nozzle located behind the tool, as shown in FIG. 3.

In use, the tank 12 is filled with material in liquid or semi-liquid form and transported to a location for dispensing the material, such as an agricultural field. During transport of vehicle 11, the apparatus 10 is elevated and held in the transport position with the links 36 connected to the upright bars 23. The links 36 are released to allow the earthworking tools 47, 48 and 49 to be lowered to their normal earthworking position, as shown in FIG. 3. This is achieved by actuation of the hydraulic cylinders 38. The material in the tank is placed under pressure and, with the valve 63 open, flows through hose 67 to tool bar passage 18 shown in FIG. 4. Tool bar 17 carries the material to the outlet nipples and into the discharge hoses 73, 73A and 73B. The tool bar 17 serves the dual function of carrying the earthworking tools 47, 48 and 49 and providing a passage for carrying and distributing fluid and fluid-like materials to a plurality of hoses connected to material dispensing nozzles. The material in passage 18 increases creases the weight or force applied to the earthworking tools, providing for increased soil penetration. The hoses 73, 73A and 73B deliver the material under pressure to nozzles 76 which direct the material a substantial distance below the surface of the soil behind the earthworking chisel tools 52. The material is continuously supplied to the nozzles 76 as long as the valve 63 is open and the pressure in the tank 12 is maintained. When materials, as liquid manure, are injected below the surface of the soil, there is a minimum of runoff of the material with rain water runoff. Also, liquid manure located below the surface of the soil has a minimum of odor.

In tank vehicles having a pump for discharging the material from the tank, the valve 63 is mounted on the discharge portion of the pump. The pump operates to remove the material from the tank and deliver the material under pressure into the hose 67.

While there have been shown and described preferred embodiments of the invention, it is understood that changes in size, material and parts, as well as the use of the structure, may be made by those skilled in the art without departing from the invention.

The embodiments of the invention in which an exclusive property or privilege is claimed are defined as follows:

1. An apparatus for dispensing material below the surface of the soil usable with a machine having a tank for carrying the material, a frame secured to the tank, said frame having rear portions located adjacent the rear of the tank, wheel means mounted on the frame for supporting the machine on the ground, and means to deliver material under pressure from the tank to the apparatus comprising: a tool bar having a longitudinal passage for carrying material, means connecting the tool bar to the rear portions of the frame and locating the tool bar transversely adjacent the rear of the tank, and means connecting the tool bar to the frame operable to selectively raise and lower the tool bar, fluid power means connected to the frame, means for connecting the tool bar passage to the means to deliver material under pressure to the apparatus, a plurality of earthworking tools mounted on the tool bar adapted to dig into the soil, first means connected to the tool bar for carrying material from the means to deliver material under pressure to the apparatus to the tool bar passage, and second means connected to the tool bar and the earthworking tools to carry material from the tool bar passage, said second means including nozzles having bottom discharge openings and means mounting the nozzles on the back of the tools with the discharge openings located adjacent the lower ends of the tools whereby the material is discharged below the surface of the soil behind the earthworking tools.

2. The apparatus of claim 1 wherein: the tool bar is a transverse linear tubular member.

3. The apparatus of claim 1 wherein: the means for connecting the tool bar to the rear portions of the frame includes a plurality of link means and means pivotally connecting the link means to the frame and tool bar.

4. The apparatus of claim 1 wherein: the earthworking tools include arcuately curved standards having lower ends, shovel means mounted on the lower ends of the standards, and means for yieldably mounting the standards to the tool bar.

5. The apparatus of claim 1 wherein: the first means includes a tubular hose connected to the tool bar and the means to deliver material under pressure to the apparatus.

6. The apparatus of claim 1 wherein: the second means includes a plurality of tubular hose means connected to the tool bar for carrying material from the tool bar passage to the nozzles.

7. The apparatus of claim 1 including: tubular nipple means secured to the tool bar, said first means including a hose attached to the nipple means.

8. The apparatus of claim 1 including: tubular material outlet nipple means secured to the tool bar, said second means including hoses attached to the outlet nipple means.

9. In combination: material transport means including tank means for carrying fluid and fluid-like materials, said tank means having a material outlet, frame means secured to the tank means, and means associated with the tank means for moving the material from the tank means through the outlet; a tool bar having a passage, first tubular means connecting the outlet to the passage to carry material to the passage, means connecting the tool bar to the frame means, power means connected to the means connecting the tool bar to the frame means and the frame means operable to selectively raise and lower the tool bar, earthworking tool means attached to the tool bar, said tool means having portions for digging into the soil, material discharge means having bottom material discharge openings located adjacent the earthworking tool means, means mounting the material discharge means on the tool means with the discharge openings located adjacent the lower ends of the portions of the tool means, and second tubular means connecting the tool bar with the material discharge means for carrying material from the passage to the material discharge means and into the soil.

10. The combination of claim 9 wherein: the tool bar is an elongated linear tubular member having an elongated passage.

11. The combination of claim 9 wherein: the outlet includes valve means to control the flow of material through the outlet means.

12. The combination of claim 9 wherein: the first tubular means is a hose connected to the outlet and the middle section of the tool bar.

13. The combination of claim 12 including: tubular nipple means secured to the tool bar, said hose being mounted on the nipple means.

14. The combination of claim 9 wherein: the material discharge means comprise nozzles having bottom discharge outlets connected to the tool means with the discharge outlets being located below the surface of the soil when the tool means are in groundworking position.

15. The combination of claim 9 wherein: the means connecting the tool bar to the frame includes a plurality of link means and means pivotally connecting the link means to the frame means and the tool bar.

16. The combination of claim 9 including: means for mounting the tool means on the tool bar at selected positions whereby the transverse spacing between the tool means can be adjusted.

17. The apparatus of claim 1 including: means to mount the tools on the tool bar at selected positions whereby the spacing between the tools can be adjusted.

* * * * *